106. COMPOSITIONS, COATING OR PLASTIC.
92

Patented July 2, 1935

2,006,426

UNITED STATES PATENT OFFICE 2,006,426

METHOD OF AND COMPOSITION FOR RETARDING THE SETTING TIME OF PORTLAND CEMENT

John E. Weiler, Wichita Falls, Tex.

No Drawing. Application December 5, 1934, Serial No. 756,045

15 Claims. (Cl. 106—24)

This invention relates to methods and means whereby the setting time of hydraulic cements such as Portland cement, may be retarded, such retardation being particularly desired at temperatures above normal atmospheric temperatures.

Portland and other analogous hydraulic cements perform an important and essential part in the development and operation of satisfactory oil wells, as such cements are generally used for backing up the strings or sections of oil well casing, and for plugging back operations where it is desired or necessary to shut off bottom water and/or to enable the oil to be pumped from a higher sand or stratum. When it is desired to place cement behind strings or sections of oil well casing or to plug back the bottom water, it is customary to mix the Portland or other cement with sufficient water to provide a fluid mixture or slurry and, by means of a suitable reciprocating or rotary pump, to force this slurry down around or through the oil well casing. It is essential to the proper performance of these operations of oil well cementing, that the initial setting of the cement be retarded for a sufficient period of time to enable the pumps to force the slurry to the desired location in the well. Further, it is essential that the cement possess both satisfactory setting properties and relatively high early strength, because of the high temperature conditions existing within the well, such temperatures generally ranging materially above atmospheric temperature, temperatures as high as 360° F. being sometimes encountered in the cementing of oil wells. It is also desirable that the cement, when finally set, possess considerable strength, density, and a uniformly fine-grained texture.

Numerous attempts have been made in the past to satisfactorily overcome the accelerating effect of these abnormal temperatures on the cement mixtures employed, and many methods and compositions have been resorted to by the oil industry to retard the setting of the cement, but such methods and compositions have been unsuccessful or unsatisfactory either because the amount or duration of retardation was insufficient or because the ultimate strength and density of the cement was adversely affected by the use of the method or retarding agent employed. In accordance with the prior art practice, the retarding ingredients have been generally such that they must be intimately ground or dry-mixed with the cement, but it has been found that such procedure with prior retardants will not produce a uniform retardation throughout the body of cement, and the cement will be full of pin holes after setting, which condition results in a consequent decrease in the compressive and tensile strength of the cement. Hence, many strings of oil well casing as well as tubing strings, have been lost within recent years, due entirely to the premature setting of the cement used in the cementing operations and/or the decrease in the strength and density of the final set cement.

An object of my invention is to disclose and provide a method whereby the accelerating effect of abnormal temperatures on the setting of hydraulic cements can be overcome.

A further object of my invention is to provide a composition for retarding the setting time of Portland and other analogous hydraulic cements, and which will retard the initial and final setting time of such cements or cementitious mixtures when they are exposed to the abnormally high temperatures usually encountered in oil well cementing operations.

A further object of my invention is to provide a method and means whereby the setting time of hydraulic cements can be retarded at abnormal temperature conditions, without impairing the ultimate strength and density of such cements.

A still further object of my invention is to provide a material for admixture with hydraulic cement, which is readily soluble in the gauging or mixing water used to make up the cement slurry, which will render the slurry fluid without the use of excessive amounts of water and which will retard the setting time of the cement without impairing the density and compressive and tensile strength of the final set product.

These and other objects, uses and advantages of the invention will become apparent to those skilled in the art from the following detailed description of illustrative compositions, methods of retarding the set of hydraulic cements, and modifications which may be utilized in the application of this invention.

I have discovered that when water-soluble boron compounds or salts are combined with water-soluble gums, the set of hydraulic cements may be retarded, even at superatmospheric temperatures, without materially affecting the ultimate strength of the cement. By the term "water-soluble gums" as used herein, reference will be had to those gums or gum-like substances which partially or wholly hydrate so as to form either true or colloidal solution with water. Illustrative of such gums, reference may be had to gum acacia, gum arabic, gum senegal, gum karaya, gum tragacanth, Iceland moss, Irish moss, gums obtained from seaweed such as agar-agar, and other amorphous bodies of complex constitution and soluble in, or at least gelatinizing with, water. Of the water-soluble boron compounds, boric acid and sodium borate may be cited.

Ordinarily, the retarding composition may contain from 25% to 95% by weight of a boron compound or mixture of compounds and from 75% to 5% of the gum.

The composition includes boric acid, sodium borate and a gum. A specific composition which has been found to be eminently suited consists of—

| | Per cent |
|---|---|
| Boric acid | 60 |
| Borax | 30 |
| Gum arabic | 10 |

It is to be understood that the ratio in which boric acid and borax are present may be appreciably varied. A composition which has been successfully used comprised—

| | Per cent |
|---|---|
| Boric acid | 30 |
| Borax | 35 |
| Gum | 35 |

Moreover, it is not necessary to use a mixture of boron compounds with the gum as any single boron compound or salt, when used in conjunction with a gum, will give satisfactory results. A mixture of boric acid and gum arabic alone, for example, will produce satisfactory retardation of set without impairing the development of the required strength upon setting.

When the above composition is used in treating a cementitious slurry, it will be found that not only is the setting time of the slurry retarded but that in addition the composition appears to maintain the slurry in a fluid condition even though relatively small amounts of water are used. Actually, it has been found that less water is required to produce a slurry of the same fluidity (when using the retarder of this invention) than is the case when no retarder is used. As a result, the strength of the set cement is relatively high because it is well known that whenever the amount of mixing water is increased, the strength of the cement is impaired. By imparting a relatively high fluidity to the slurry, the pumping of the slurry through a casing is facilitated. Inasmuch as no excessive amount of water is used in obtaining such fluidity, the set cement has a greater density and a more uniformly fine-grained texture.

In some instances it may be desirable to include potassium dichromate as one of the ingredients of the retarding composition, this substance when used in combination with the others appearing to increase the density and improve the texture of the set cement. Up to about 35% of the retarder may consist of potassium dichromate.

In use, from about 0.5% to 3.5% of the composition is used by weight of the cement. The free lime content of a cement influences the amount of retarder to be used for a given retardation, lower quantities of retarder being generally used with cements of low free lime content. For practical purposes, therefore, the range above given is satisfactory but the amount of retardation desired and the free lime content of the cement should be considered. The composition is most readily utilized by being first dissolved in the amount of mixing water which is to be used with a given cement, and the cement then mixed with the water after the retarding composition has been dissolved or hydrated and dissolved in the water. When a readily soluble gum is used, the mixture of gum and boron compounds may be intimately mixed with the ground cement and shipped in that form.

In order that the advantages of the invention may be readily understood, specific results obtainable thereby will be described. The results reported in the following table were obtained by using 2 grams of borax or boric acid, as the case may be, with 2 grams of gum arabic or other gum, 800 grams of Portland cement and 320 grams of water. The boron compound and gum were first dissolved in the gauging water and the cement then added. The slurry was maintained at a temperature of approximately 170° F. in each instance.

| Percentage of admixture consisting of borax and gum arabic | Time of initial set | Time of final set |
|---|---|---|
| | Minutes | Minutes |
| 0.1 | 73 | 82 |
| 0.3 | 115 | 123 |
| 0.5 | 235 | 265 |

| Percentage of admixture consisting of boric acid and gum arabic | Time of initial set | Time of final set |
|---|---|---|
| | Minutes | Minutes |
| 0.1 | 75 | 83 |
| 0.3 | 161 | 171 |
| 0.5 | 335 | 357 |

| Percentage of admixture consisting of borax and agar-agar | Time of initial set | Time of final set |
|---|---|---|
| | Minutes | Minutes |
| 0.0 | 60 | 65 |
| 0.1 | 98 | 128 |
| 0.3 | 217 | 237 |
| 0.5 | 422 | 440 |

Although the setting times above given are predicated on temperature conditions of approximately 170° F., they are, in general, representative of the effects obtained at higher temperatures. The amount of retardation obtained at temperatures above 170° F. (and even at temperatures above 212° F. provided the pressure is sufficiently high to prevent boiling) with a given portion of the composition of this invention is generally not as pronounced as at 170° F. In some instances, when the well hole is at a high temperature, say above 250° F., it may be necessary to employ a higher proportion of retardant than that which would be used to obtain the same retardation at 170° F. For ordinary purposes, when using hydraulic cements having a low free lime content, from about 0.2% to 2.0% of the retarder will be sufficient.

Those skilled in the art will observe that a composition capable of retarding the set of hydraulic cements without impairing the development of required strength upon setting has been provided and that such retardation is effective at elevated temperatures. Furthermore, it will be observed that the composition of this invention increases the fluidity of a slurry, thereby facilitating pouring, placing or pumping thereof without requiring the use of excessive amounts of water which ordinarily greatly impair the strength of the set cement. As has been pointed out hereinabove, the composition may be added to the mixing water directly or may be premixed with the cement before the cement is converted into a slurry.

Although a particular use has been specifically described, namely, the use of the retarder in treating cementitious slurries for well cementing operations, it is apparent that the composition and slurries containing the same may be used for various other purposes. All the modifications, adaptations and changes which would occur to those skilled in the art and which come within the scope of the appended claims are embraced thereby.

This application is a continuation in part of Serial No. 634,449.

I claim:

1. A method of forming fluid hydraulic cement slurries adapted to be used in well cementing operations, the slurries having a retarded setting time at temperatures above atmospheric, which comprises the steps of forming a hydraulic cement slurry containing a water-soluble boron compound and a water-soluble gum in addition to hydraulic cement and water.

2. A method of forming a fluid Portland cement slurry adapted for use in well cementing operations, the slurry having a retarded setting time at temperatures above atmospheric, which comprises the step of forming a Portland cement slurry containing borax, boric acid, and a water soluble gum in addition to Portland cement and water.

3. A method of forming a fluid Portland cement slurry adapted for use in well cementing operations, the slurry having a retarded setting time at temperatures above atmospheric, which comprises the step of forming a Portland cement slurry containing a water-soluble boron compound from the group consisting of borax and boric acid, and a water-soluble gum, in addition to Portland cement and water.

4. A cement capable of forming a fluid slurry when mixed with water, said cement having a retarded set at temperatures above atmospheric, said cement comprising a hydraulic cement mixed with a minor proportion of a water-soluble boron compound and a water-soluble gum.

5. A cement capable of forming a fluid slurry when mixed with water, said cement having a retarded set at temperatures above atmospheric, said cement comprising a hydraulic cement mixed with a minor proportion of borax, boric acid and a water-soluble gum.

6. A cement capable of forming a fluid slurry when mixed with water, said cement having a retarded set at temperatures above atmospheric, said cement comprising a hydraulic cement mixed with a minor proportion of a water-soluble boron compound from the group consisting of borax and boric acid, and a water-soluble gum.

7. In a method of retarding the setting time of Portland cement slurries at temperatures above atmospheric without impairing the development of high early strength, the step of dispersing a water-soluble gum and dissolving borax and boric acid in a part of the mixing water used in forming a Portland cement slurry.

8. A cement capable of forming a fluid slurry when mixed with water, said cement having a retarded set at temperatures above atmospheric without impairing high early strength, which comprises: Portland cement with a minor proportion of a water-soluble boron compound, a water-soluble gum, and potassium bichromate.

9. A cement capable of forming a fluid slurry when mixed with a normal amount of water, said cement having a retarded set at temperatures above atmospheric and the ability to develop required strength upon setting, which comprises: Portland cement with a minor proportion of a water-soluble boron compound and a water-soluble gum.

10. A cement capable of forming a fluid slurry when mixed with a normal amount of water, said cement having a retarded set at temperatures above atmospheric and the ability to develop a required strength upon setting, which comprises: Portland cement with from about 0.2% to 3.5% by weight thereof of a water-soluble boron compound and a water-soluble gum.

11. A method of forming fluid hydraulic cement slurries adapted for use in well cementing operations, the slurries having a retarded setting time at temperatures above atmospheric, which comprises the steps of: forming a hydraulic cement slurry containing from about 0.2% to 2.0% of a mixture of water-soluble boron compound and a water-soluble gum in addition to hydraulic cement and water.

12. A method of forming fluid hydraulic cement slurries adapted for use in well cementing operations, the slurries having a retarded setting time at temperatures above atmospheric, which comprises the steps of: forming a hydraulic cement slurry containing from about 0.5% to 3.5% of a mixture of water-soluble boron compound and a water-soluble gum in addition to hydraulic cement and water.

13. A method of forming a fluid Portland cement slurry adapted for use in well cementing operations, the slurries having a retarded setting time at temperatures above atmospheric, which comprises the step of forming a Portland cement slurry containing Portland cement, water, and from 0.2% to 3.5% by weight of the cement of a retarding agent containing from 25% to 95% of a water-soluble boron compound and from 75% to 5% of a water-soluble gum.

14. A composition adapted to retard the setting time of hydraulic cement slurries at sub-atmospheric temperatures, composed of 25% to 95% by weight of a water-soluble boron compound and from 5% to 75% by weight of a water-soluble gum.

15. A composition adapted to retard the setting time of hydraulic cement slurries at sub-atmospheric temperatures, composed of 25% to 95% by weight of a mixture of sodium borate and boric acid and 5% to 75% by weight of a water-soluble gum.

JOHN E. WEILER.